(12) United States Patent
Wang et al.

(10) Patent No.: US 7,002,784 B2
(45) Date of Patent: Feb. 21, 2006

(54) CURRENT COMPENSATION METHOD AND DEVICE FOR POWER SYSTEM PROTECTION

(75) Inventors: Jianping Wang, Västerås (SE); Zoran Gajic, Västerås (SE); Mikael Goransson, Västerås (SE)

(73) Assignee: ABB AB, Vasteras (SE)

( * ) Notice: Subject to any disclaimer, the term of this patent is extended or adjusted under 35 U.S.C. 154(b) by 94 days.

(21) Appl. No.: 10/332,266

(22) PCT Filed: Jul. 11, 2001

(86) PCT No.: PCT/SE01/01604

§ 371 (c)(1),
(2), (4) Date: Jun. 26, 2003

(87) PCT Pub. No.: WO02/04967

PCT Pub. Date: Jan. 17, 2002

(65) Prior Publication Data

US 2004/0090728 A1    May 13, 2004

(30) Foreign Application Priority Data

Jul. 12, 2000   (SE)   .................................. 0002632

(51) Int. Cl.
H02H 9/08   (2006.01)
(52) U.S. Cl. .................................................. 361/93.9
(58) Field of Classification Search .............. 361/93.9, 361/63, 42, 44, 65, 67, 87; 702/58, 64, 59; 700/293
See application file for complete search history.

(56) References Cited

U.S. PATENT DOCUMENTS

| | | | | |
|---|---|---|---|---|
| 4,502,086 A | * | 2/1985 | Ebisaka | ........................ 361/87 |
| 4,561,120 A | * | 12/1985 | Andow et al. | .................. 398/6 |
| 4,862,308 A | | 8/1989 | Udren | .......................... 361/45 |

(Continued)

Primary Examiner—Brian Sircus
Assistant Examiner—Boris Benenson
(74) Attorney, Agent, or Firm—Dykema Gossett, PLLC (57) ABSTRACT

The present invention relates to a method for current compensation of a protection system for protecting a zone in a power system, which zone comprises a number of transmission lines connected to power sources and a number of transmission lines connected to a number of loads where the power sources and the loads are arranged outside the zone and a number of current transformers (CT) arranged to the transmission lines, wherein the method comprises the steps of continuously measuring all the incoming currents ($I_{in}$) to the zone, continuously measuring all the outgoing currents ($I_{out}$) from the zone, continuously calculating the differential current ($I_d$) according to $I_d=I_{in}-I_{out}$, continuously calculating q=$I_{out}/I_{in}$, continuously comparing q with set values and continuously comparing $I_{out}$ with a set value Set1. The invention is characterised by setting $I_{out}=I_{in}=I_{comp}$ at the instant when q changes and $I_{out}$ exceeds the value set1, which is an indication of the occurrence of a fault external to the protection zone due to saturation of the CT of the faulted outgoing transmission line, and using the value $I_{comp}$ in the protection system in order to prevent tripping of the protection system. The present invention also relates to a device and a computer program product for performing the method.

16 Claims, 7 Drawing Sheets

U.S. PATENT DOCUMENTS

| | | | |
|---|---|---|---|
| 5,592,393 A | 1/1997 | Yalla | 700/293 |
| 5,757,651 A | 5/1998 | Rudat | 700/293 |
| 5,809,045 A | 9/1998 | Adamiak et al. | 371/48 |
| 6,356,421 B1 * | 3/2002 | Guzman-Casillas et al. | 361/36 |
| 6,501,631 B1 * | 12/2002 | Wang et al. | 361/63 |
| 6,829,544 B1 * | 12/2004 | Kasztenny et al. | 702/59 |

* cited by examiner

CURRENT COMPENSATION METHOD AND DEVICE FOR POWER SYSTEM PROTECTION

TECHNICAL FIELD

The present invention relates to a method for current compensation of a protection system for protecting a zone in a power system, which zone comprises a number of transmission lines connected to power sources and a number of transmission lines connected to a number of loads where the power sources and the loads are arranged outside the zone and a number of current transformers (CT) arranged to the transmission lines, wherein the method comprises the steps of continuously measuring all the incoming currents ($I_{in}$) to the zone, continuously measuring all the outgoing currents ($I_{out}$) from the zone, continuously calculating the differential current (Id) according to $I_d = I_{in} - I_{out}$, continuously calculating $q = I_{out}/I_{in}$, and continuously comparing q with a set value S.

BACKGROUND OF THE INVENTION

During a number of years there has been a rapid development in power systems and the capacity requirements of these in turn require highly reliable relaying principles for protecting the system or components of the system in case of faults. These protection requirements apply to many parts of the power system such as for example transformer differential protection, motor differential protection, generator differential protection and busbar protection.

In this kind of protection system, the incoming and outgoing currents of a certain protection zone have been measured since these may be used to detect if a fault occurs within or outside the protection zone. In order to measure these currents, so called current transformers, or CT, are used, one on each incoming or outgoing line. Further each line is provided with a circuit breaker for breaking the line in case of a fault.

Digital protection systems have been developed to monitor a power system. These protection systems not only requires fast operation speed for heavy fault currents, but also need to be stable for external faults which are close to the protection zone. As there are a lot of different current transformers connected to the feed lines and there is no impedance to limit the fault current within the zone, it might be a very severe CT saturation condition in case of an external fault close to the CT. The very heavy CT saturation will produce an inaccurate current value and thus a wrong picture for the type of differential protection systems used currently. As a consequence, the differential protection might misoperate in case of an external fault and thereby trip for protection against a non-existent internal fault, especially for heavy CT saturation conditions.

A very difficult technical problem for this type of protection system is called simultaneous faults. This means that an internal fault occurs following an external fault and it is not possible to produce a trip signal with current differential protection methods because there are enormous crossing currents while the internal fault is taking place. The worst case occurs when the external fault current is equal to the internal fault current. In this case both fault currents share the source current and the differential current will have a large difference compared with the restrained current.

The modern low impedance differential protection algorithm used can be expressed as follows. If we suppose a passive connection point with N transmission lines, $I_d$ represents the differential current and $I_r$ represents the restrained current among those lines.

$$I_d = \left| \sum_{i=1}^{N} Ii \right| \quad (1)$$

$$I_r = \sum_{i=1}^{N} |Ii| \quad (2)$$

$$I_d - k \times I_r > D \quad (3)$$

In case of internal fault we have $I_d = I_r$ so that equation (3) can be confirmed if we set the proper k value (k<1) and D value. Equation (3) is known as percentage differential protection since it introduces the restrained current in order to make protection more stable for external faults.

In case of normal load or external faults, $I_d$ should be zero so that the equation (3) is not satisfied. As a consequence there will not be a trip signal issued according to Kirchhoff's first law. In reality, $I_d$ is still larger than zero for external fault cases during CT saturation period so that a misoperation will be produced during this time period.

The main technical problems for the algorithms used with digital differential protection systems is misoperation due to external faults close to the feeder CT's especially in case of different CT cores. In this case, the saturation of CT in the faulted line will produce inaccurate current values similar to an internal fault in the measuring circuits, that is, the differential current $I_d$ will be the same as the restrained current $I_r$ during the CT saturation period when an external fault occurs.

In the case of busbar protection, a further drawback with some protection systems is that CT saturation is compensated in each bay of the system. This means that there could be a plurality of measuring devices for a large power system area, which is costly and ineffective.

BRIEF DESCRIPTION OF THE INVENTION

The object of the present invention is to provide a protection system which can provide reliable protection also for very difficult conditions, such as external faults close to feeder CT's or simultaneous fault cases.

This object is achieved by the method according to claim 1, the device according to claim 8 and the computer program product according to claim 10. Further aspects of the present invention are covered by the independent claims.

The benefits of the present invention are several. It is based on continuously monitoring the ratio between the outgoing and incoming current of a protection zone. In case of an external fault, because the CT saturates due to very high outgoing current, in which saturation may affect the protection system so that a tripping signal is issued wrongly, the ratio provides an indication of the point when the CT saturates. The present invention then puts the outgoing current equal to the incoming current in order to compensate for the influence of the external fault on the protection system. The compensated value of the outgoing current is then used to calculate new differential and restrained currents, on which the tripping algorithm is based.

This provides a much more stable protection algorithm for external faults compared to the state of the art, thus greatly reducing the risk for misoperation of the protection system.

The present invention also provides a method comprising an algorithm for detecting an internal fault during an occurring external fault, which up to now has been virtually impossible to detect. The algorithm is based on the facts that the instant value of the outgoing current does not follow the incoming current after zero crossing, which should be the case when an external fault occurs, i e the incoming current and the outgoing current should be practically the same, the occurrence of a differential current. In external fault cases there is no differential current before CT saturation, and thus the presence of a differential current is an indication of an internal fault. By continuously monitoring the values of these currents, calculating the integrated values and comparing them with previous values and/or set values, an internal fault can be accurately detected during an external fault.

A further advantage with the present invention is the approach to include all incoming currents and outgoing currents of a protection zone instead of monitoring in each bay or for each equipment.

These and other benefits and aspects of the present invention will become apparent from the detailed description of the invention in connection with the accompanying drawings.

BRIEF DESCRIPTION OF THE DRAWINGS

In the following detailed description of the present invention, reference will be made to the accompanying drawings, of which

DETAILED DESCRIPTION OF THE INVENTION

The present invention relates to protection of power systems, and in particular to areas of power systems having no sources or loads within those areas. These areas will hereafter be named protection zones PZ. Within these zones a number of feed lines connected to external sources are arranged as well as a number of feed lines connected to external loads. External in this context means outside the protection zone. The protection zone does not contain any sources or loads and can be seen as a passive part of a power system. The protection zone could comprise everything from one to a plurality of bays, busbars, equipment and the like.

Figure 7:
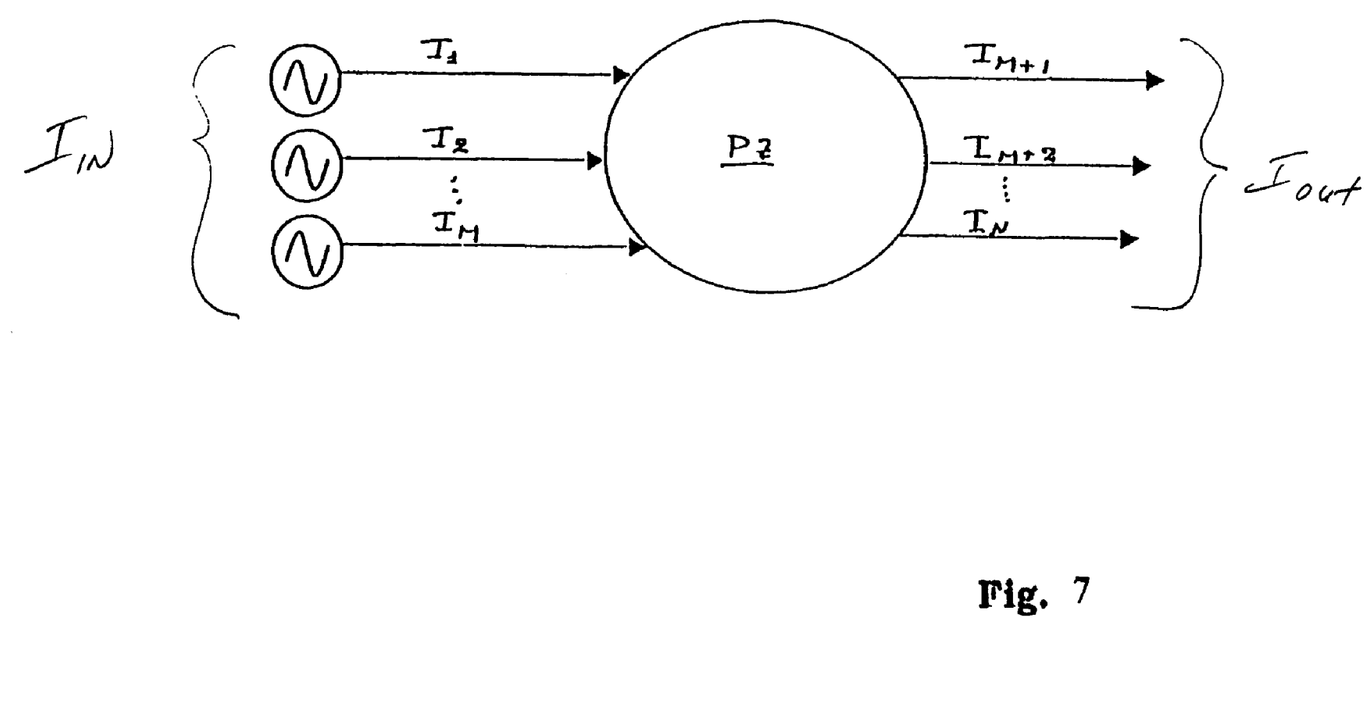
FIG. 7 shows schematically the principle of a protection zone according to the invention.

In FIG. 7 the principle of the protection zone PZ is shown schematically. The total current from all sources entering the zone is referred to as $I_{in}$ and the total current to all loads from PZ is referred to as $I_{out}$. The currents are conventionally measured by current transformers CT. For a given PZ it is quite clear that all incoming currents have to be equal to the outgoing currents in normal load cases, when the PZ is defined as above, i e $I_{in}=I_{out}$ or $I_{out}/I_{in}=1$. This should also be true if an external fault occurs.

If one phase is considered in a PZ and we suppose that N feed lines are present in a certain PZ, the incoming current $I_{in}$ and outgoing current $I_{out}$ of the phase can be obtained by equations (4) and (5):

$$I_{in} = \left| \sum_{i=1}^{M} Ii \right| \quad (4)$$

$$I_{out} = \left| \sum_{i=M+1}^{N} Ii \right| \quad (5)$$

Here, the index i from 1 to M corresponds to the incoming currents to PZ and i from M+1 to N corresponds to the outgoing currents from the protection zone.

The instantaneous values of the differential current $I_d$ and the restrained current $I_r$ can be expressed by $I_{in}$ and $I_{out}$ as $$I_d = I_{in} - I_{out} \quad (6)$$

$$I_r = I_{in} + I_{out} \quad (7)$$

In order to have stable values of the incoming current $I_{in}$ and the outgoing current $I_{out}$ for a certain protection zone, integrated values of these currents as well as $I_d$ and $I_r$ can be obtained by continuous integration over each fundamental frequency cycle T as $$I_{IN} = \int_{tl}^{(tl+T)} I_{in} dt \quad (8)$$

$$I_{OUT} = \int_{tl}^{(tl+T)} I_{out} dt \quad (9)$$

$$I_D = \int_{tl}^{(tl+T)} I_d dt \quad (10)$$

$$I_R = \int_{tl}^{(tl+T)} I_r dt \quad (11)$$

By using the integrated values from the equations (8) to (11), an algorithm can be formed, by which faults inside the protection zone are detected very fast and by means of which a very fast tripping signal can be generated, disconnecting the zone from the power system.

For most power systems, in case of serious faults, tripping must be done very quickly because of the stability of the system but also in order to prevent serious damage. Preferably a tripping signal should be produced within 5 ms following internal faults.

This may be achieved with the present invention by using the rate of change of the integrated continuous values of $I_{IN}$, $I_{OUT}$ and $I_D$. The fact is that all of these three integration values are one variable function in the time domain if a continuous integration is performed. This means that integration values will change depending on when the integration is performed. If we suppose that $$k_1(t) = d(I_D(t))/dt$$

$$k_2(t) = d(I_{IN}(t))/dt$$

$$k_3(t) = d(I_{OUT}(t))/dt \quad (12)$$

where $k_1$, $k_2$, $k_3$ are rate of change values. If a discrete time domain system is used, the rate of change values may be expressed as $$k_1(i) = I_D(i) - I_D(i-1)$$

$$k_2(i) = I_{IN}(i) - I_{IN}(i-1)$$

$$k_3(i) = I_{OUT}(i) - I_{OUT}(i-1) \qquad (13)$$

Here, index i corresponds to the sampling instant in the discrete time domain and i−1 corresponds to the previous sampling time.

It has been shown that there exists differences for the factors $k_1(i)$, $k_2(i)$ and $k_3(i)$ for different cases such as normal load, external faults and internal faults. This is shown in table 1 below.

| Normal load cases | External fault cases | Internal fault cases |
|---|---|---|
| $k_1(i) = 0$ | $k_1(i)$ increases after saturation of current transformer | $k_1(i)$ increases |
| $k_2(i) = 0$ | $k_2(i)$ increases | $k_2(i)$ increases |
| $k_3(i) = 0$ | $k_3(i)$ increases before saturation of current transformer | $k_3(i)$ decreases |

By continuously monitoring the rate of change values $k_1$, $k_2$ and $k_3$ a logic may be created for producing a fast tripping signal. The above described fast tripping system is described in detail in the Swedish Patent Application No SE0001436-5, which application hereby is included in its entirety by reference.

External Faults

From a theoretical point of view, it is always true that the outgoing current $I_{OUT}$ equals the incoming current $I_{IN}$ for normal load conditions and for external faults. In reality, the outgoing current will not be equal to the incoming current once the corresponding CT's saturate. The worst cases of CT saturation occurs during external fault conditions where the fault current in the faulted location might cause the CT to saturate after 1 ms. If the CT saturates, the outgoing current will be equal to zero during CT saturation period and the differential current will be equal to the restrained current during CT saturation period. As a result the traditional percentage differential protection algorithm will misoperate.

Figure 1:
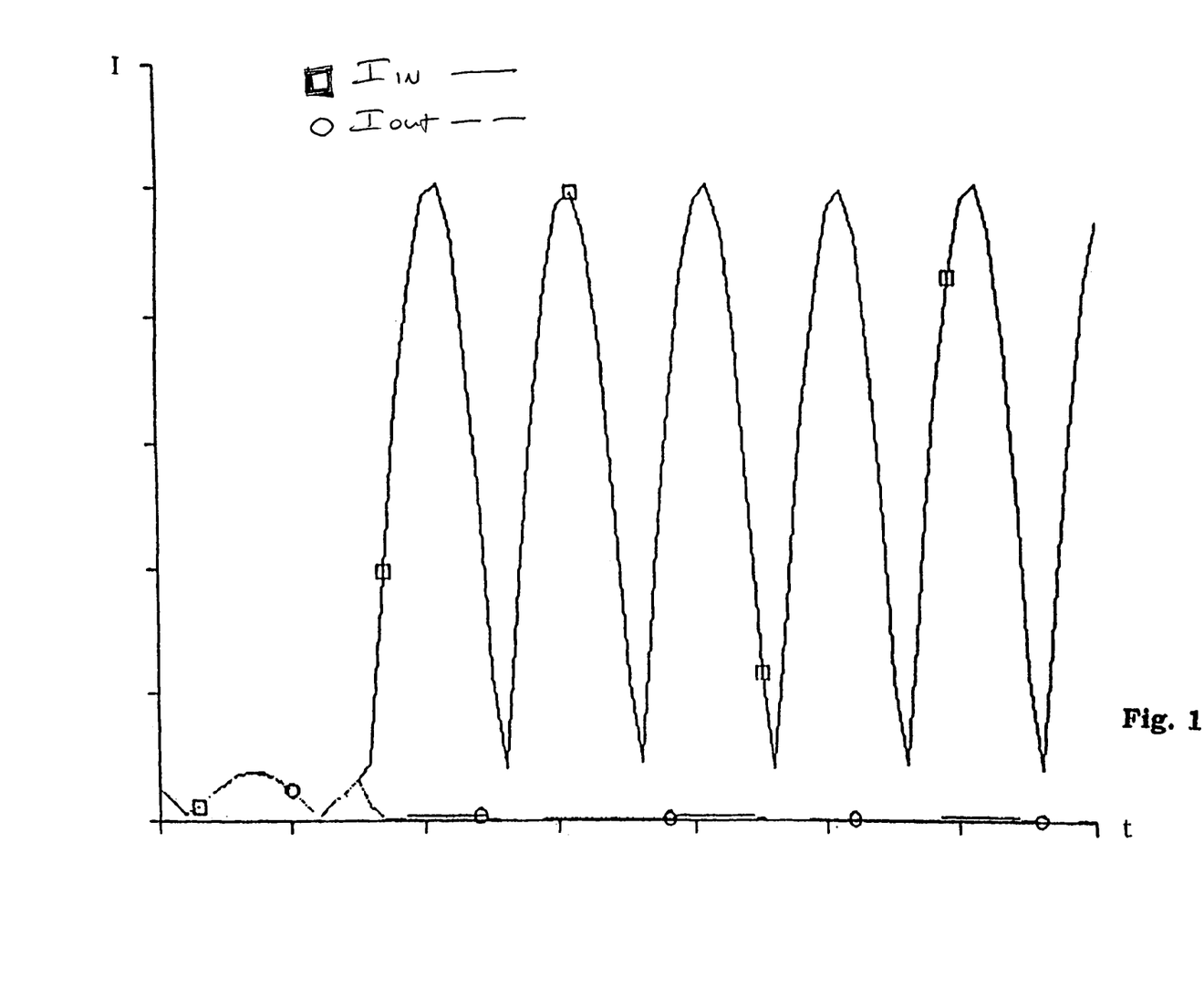
FIG. 1 shows an example of the behaviour of incoming and outgoing currents for an internal fault which occurs in a protection zone.
Figure 2:
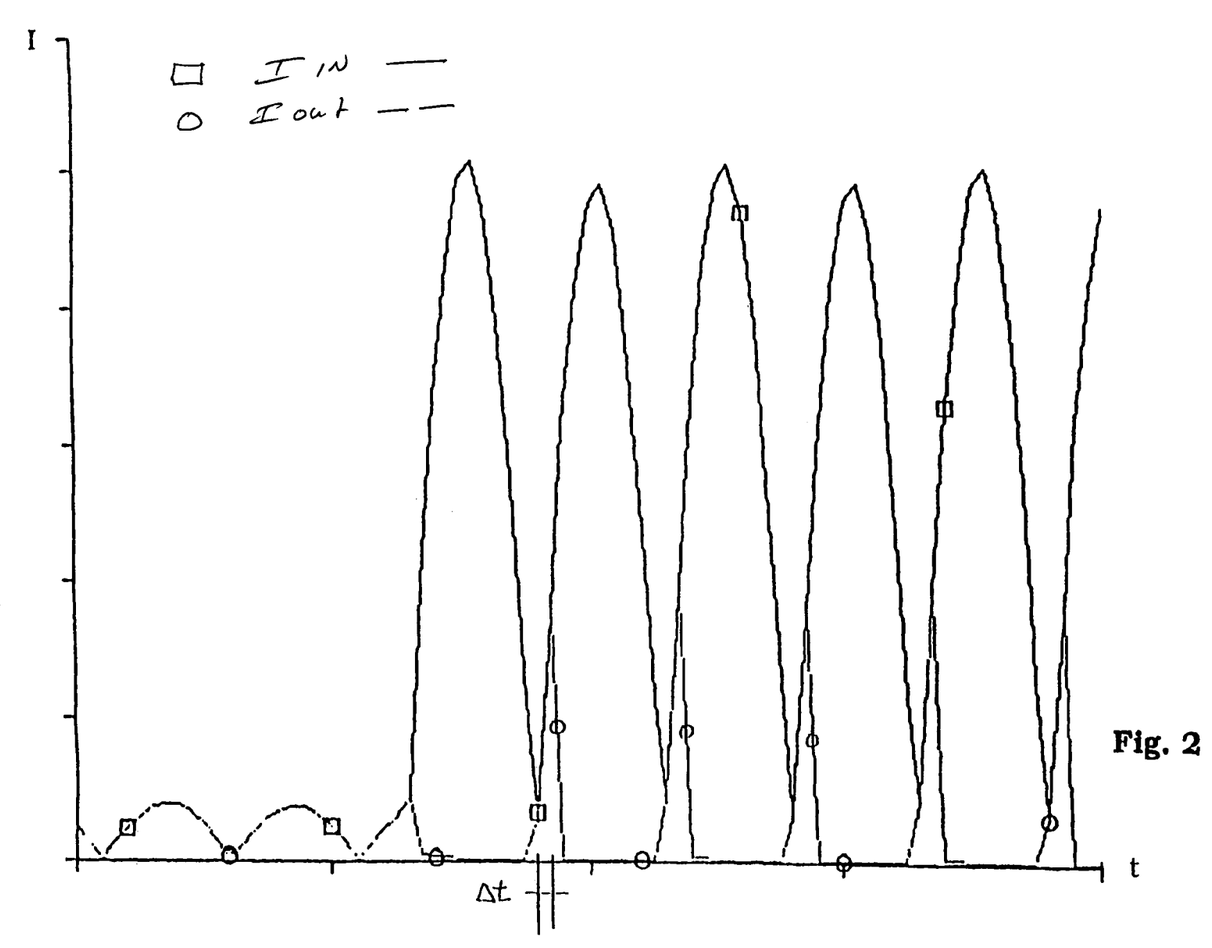
FIG. 2 shows an example of the behaviour of incoming and outgoing currents for an external fault which occurs outside the protection zone.
Figure 3:
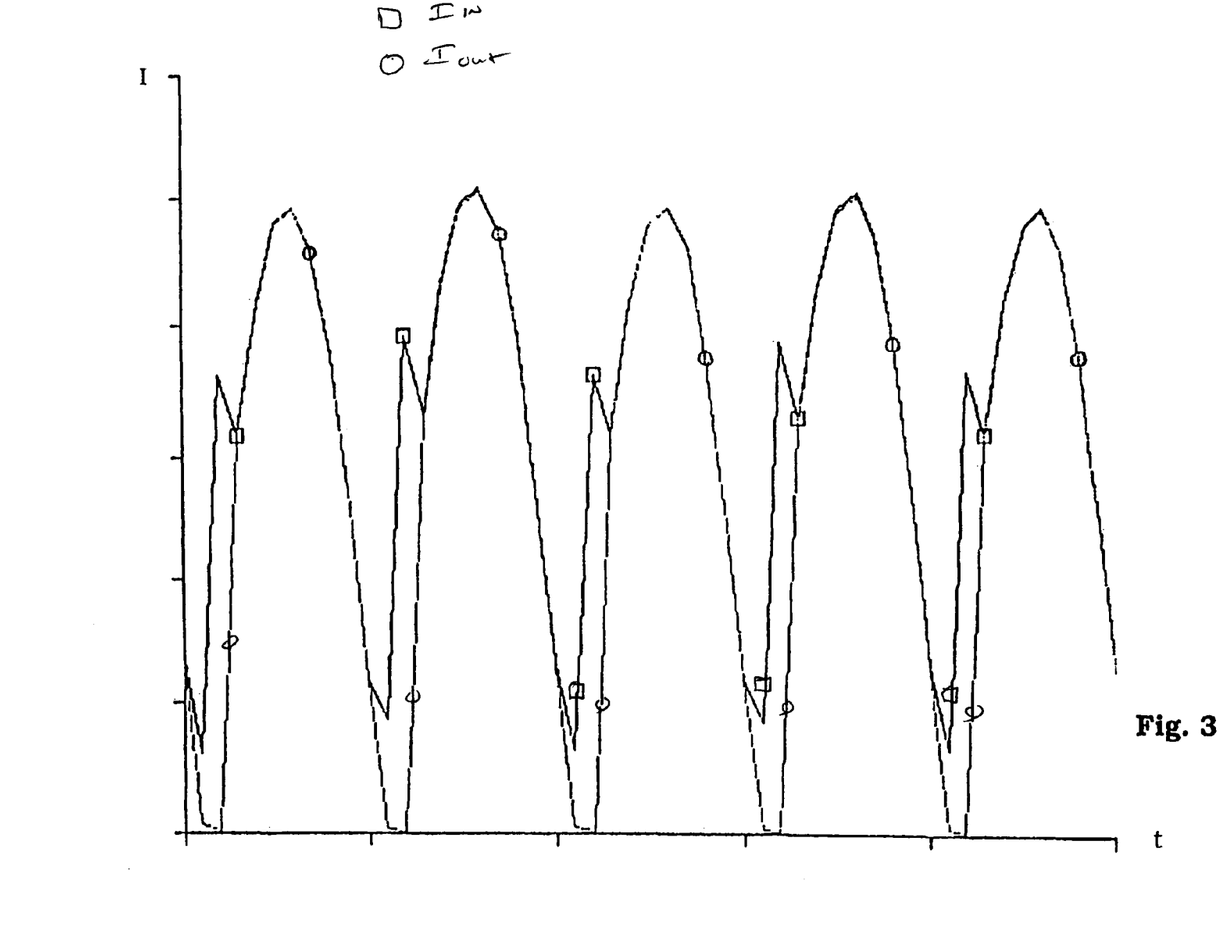
FIG. 3 shows an example of differential and restrained currents for the external fault.

The actual outgoing current and incoming current in internal and external fault cases are shown in FIGS. 1 and 2 respectively. In the figures, the curve marked with □ represents the incoming current and the curve marked with o represents the outgoing current. The differential current and restrained current are shown in FIG. 3. In that figure, the curve marked with □ represents the restrained current and the curve marked with o represents the differential current.

In order to make a very stable differential protection algorithm, a current compensation algorithm is proposed. It involves compensating the outgoing current value based on the incoming current value during external fault cases in order to always keep the differential current close to zero during external fault cases. As a consequence, a stable algorithm can be formed even for very serious CT saturation cases.

In order to compensate the outgoing current with the incoming current during external fault cases, it has been found that the outgoing current must equal the incoming current both during normal load conditions and external fault conditions. If the CT saturates, the outgoing current will be equal to zero so that outgoing current will not be equal to the incoming current. From FIG. 2 it can be derived that there is a short time period At that the outgoing current equals the incoming current before the CT saturates for external fault cases.

A compensation algorithm can be formed according to the outgoing current and incoming current wave forms shown in FIG. 2. The ratio $I_{out}/I_{in}$ and the changes of outgoing current and incoming current are used to detect the CT saturation in external fault cases. Once there is a CT saturation, $I_{out}/I_{in}$ will drop sharply and $I_{out}$ will decrease so that the current compensation must be made from this time instant. In order to avoid the miscompensation during normal load condition and internal fault conditions, a pickup value is used to check if the outgoing current is larger than a preset value.

Figure 4:
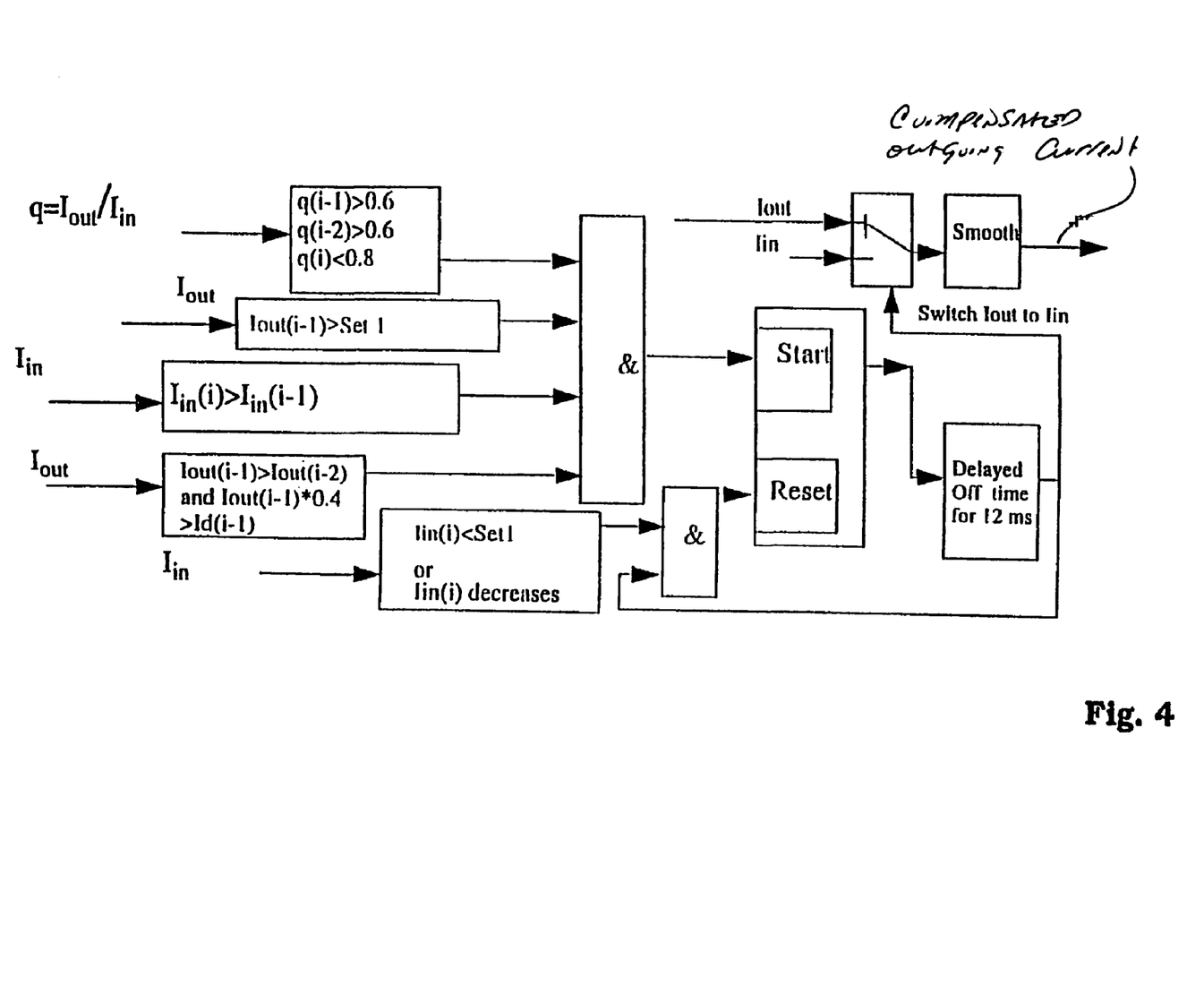
FIG. 4 shows current compensation logic according to the present invention.

The total current compensation logic is shown in FIG. 4. Here the ratio $q = I_{out}/I_{in}$ is compared to a set value of 0.6. For ideal conditions the value should be 1, but due to measuring and other errors and influences, it is set somewhat lower. i denotes the present time and i−1 and i−2 the pervious sampling times. Thus two previous sampling values of q are compared against the set value of 0.6. If the sampled values q(i−1) and q(i−2) are both larger than 0.6, and present time q(i) is less than 0.8, a signal is sent to an AND gate.

Further the value of the outgoing current $I_{out}(i-1)$ of the previous sampling is compared to a set value set1. If $I_{out}(i-1)$ is larger than set1, where set1 is based on pre-fault outgoing current values, a signal is sent to the AND gate.

The value of $I_{in}$ of the present sampling, $I_{in}(i)$ is also compared the previous sampling value $I_{in}(i-1)$, and if the present value is greater than the previous value, a signal will be sent to the AND gate.

A further logic unit compares the previous value of $I_{out}$ with a yet previous value of $I_{out}$, $I_{out}(i-1) > I_{out}(i-2)$, and compares $I_{out}(i-1) \times 0.4$ with the previous value of $I_d$, $I_{out}(i-1) \times 0.4 > I_d(i-1)$. If those requirements are fulfilled, a signal will be issued to the AND gate.

If all above conditions are met, i e $$q(i-2)>0.6,\ q(i-1)>0.6,\ q(i)<0.8 \qquad (12)$$

AND $$I_{out}(i-1)>\text{set1} \qquad (13)$$

AND $$I_{in}(i)>I_{in}(i-1) \qquad (14)$$

Figure 5:
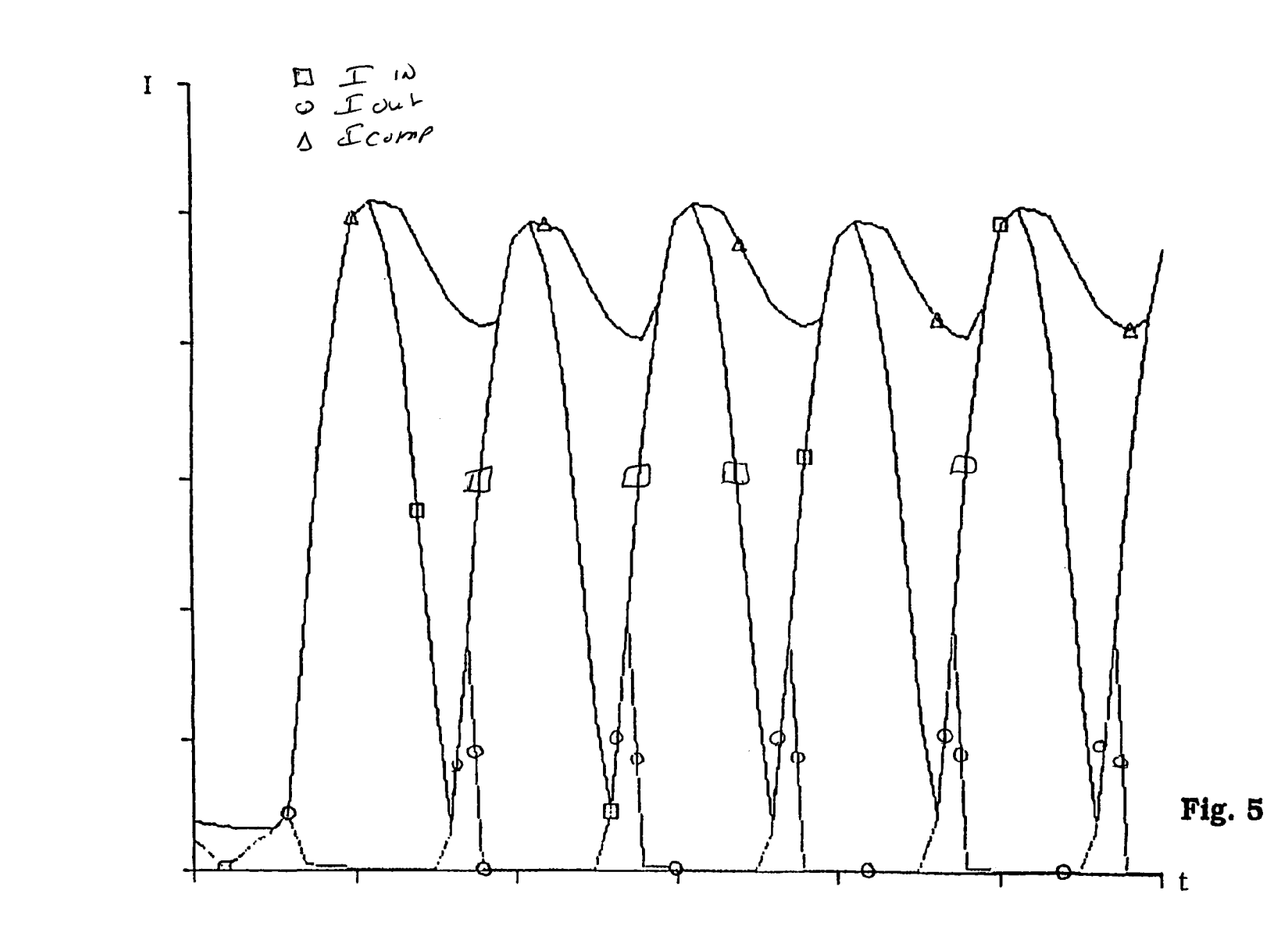
FIG. 5 shows an example of compensation results obtained with the present invention for external fault conditions.

AND $$I_{out}(i-1)>I_{out}(i-2) \text{ AND } I_{out}(i-1)*0.4>I_d(i-1) \qquad (15)$$

the AND gate will issue a signal that will operate a switch, which puts $I_{out}$ equal to $I_{in}$. At the same time a delay unit is triggered, that will hold the switch in that state for 12 ms. The signal from the delay unit is sent to a second AND gate. A further logical unit is connected to the second AND gate. This logical unit compares the present $I_{in}(i)$ value with the set1 value or that the present $I_{in}(i)$ value decreases. If this is true and a signal is sent from the delay unit, a signal is issued from the second AND gate to reset the system. The function of the delay unit is to provide a timer to smooth the compensated outgoing current as seen in FIG. 5.

The results of the current compensation is shown in FIG. 5 where the curve marked with □ represents the incoming current, the curve marked with o represents the outgoing current and the curve marked with Δ represents compensated current. Here, the outgoing current becomes zero after 1.5 ms when CT saturates and the compensated current is almost equal to the incoming current during external fault conditions.

If the compensated current $I_{comp}$ is used to calculate the integrated outgoing current, an almost perfect compensation result can be obtained. The new integrated values are obtained from the following equations.

$$I_{OUTc} = \int_{tl}^{(tl+T)} I_{comp}\,dt \quad (16)$$

$$I_{Rnew} = I_{OUTc} \quad (17)$$

$$I_{Dnew} = I_{IN} - I_{OUTc} \quad (18)$$

With the new integrated differential current $I_{Dnew}$ and restrained current $I_{Rnew}$ it is very easy to build a stable differential protection algorithm based on percentage restrained criterion because the differential current $I_{Dnew}$ is equal to zero in cases of external faults and normal outgoing conditions. Finally a tripping criterion can be built based on these values with equation (19) below where the stability factor k is fixed around 0.5.

$$I_{Dnew} - k \times I_{Rnew} > 0 \quad (19)$$

This method and algorithm may also be used to detect simultaneous faults as long as the internal fault current is higher than the external fault current.

Figure 6:
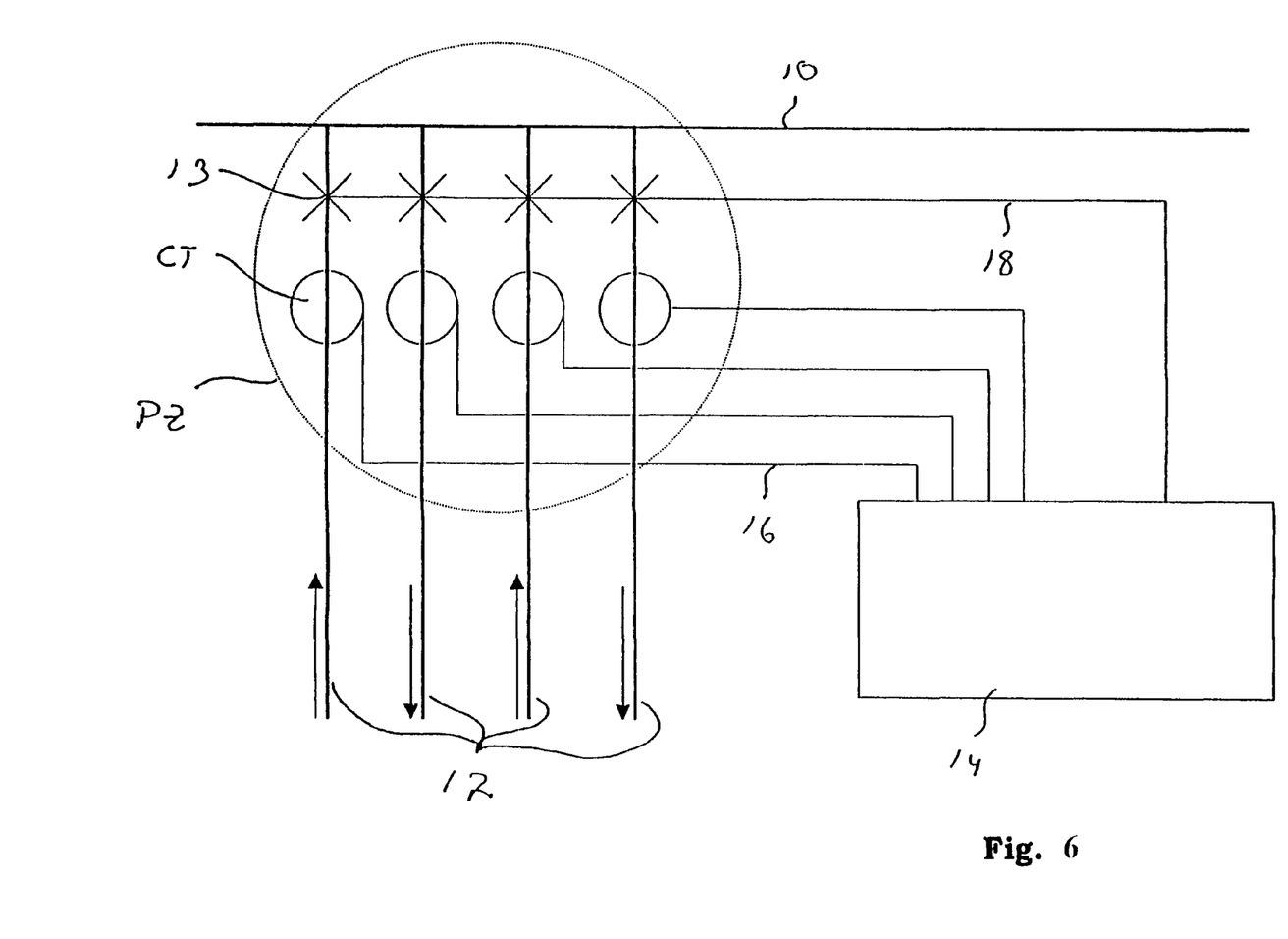
FIG. 6 shows schematically a device for performing the method according to the invention.

FIG. 6 schematically shows how the method according to the invention may be implemented in a power system. A busbar 10 is connected to a number of transmission lines 12, where some are incoming lines connected to power sources and some are outgoing lines connected to loads. The connection of the transmission lines to the busbar is considered to be the protection zone PZ.

Each transmission line is arranged with a current transformer CT. Each transmission line is further provided with a breaker 13, capable of breaking the connection. The CTs are connected to a fast tripping device 14 via lines 16. The CTs are designed to provide currents that are proportional to the currents of the transmission lines. The fast tripping device comprises means for carrying out the steps of measuring the currents, calculating the differential current, integrating the currents, differentiating the integrated values in order to detect external faults and simultaneous faults. The tripping signal is transmitted to all breakers arranged on the transmission lines via line 18.

The fast tripping device may comprise filters for filtering the signals, converters for sampling the signals and one or more micro computers. The micro processor (or processors) comprises a central processing unit CPU performing the steps of the method according to the invention. This is performed with the aid of a dedicated computer program, which is stored in the program memory. It is to be understood that the computer program may also be run on a general purpose industrial computer instead of a specially adapted computer.

The software includes computer program code elements or software code portions that make the computer perform the method using equations, algorithms, data and calculations previously described. A part of the program may be stored in a processor as above, but also in a ROM, RAM, PROM or EPROM chip or similar. The program in part or in whole may also be stored on, or in, other suitable computer readable medium such as a magnetic disk, CD-ROM or DVD disk, hard disk, magneto-optical memory storage means, in volatile memory, in flash memory, as firmware, or stored on a data server.

It is to be understood that the embodiments described above and shown on the drawings are to be regarded as non-limiting examples of the present invention and that it is defined by the appended patent claims.

What is claimed is:

1. A method for current compensation of a protection system for protecting a zone in a power system having a number of incoming transmission lines connected to power sources and a number of outgoing transmission lines connected to a number of loads where the power sources and the loads are arranged outside the zone and a number of current transformers (CT) responsively coupled to the transmission lines, comprises the steps of:

continuously measuring all incoming currents ($I_{in}$) to the zone, continuously measuring all outgoing currents ($I_{out}$) from the zone, continuously calculating a differential current ($I_d$) according to $I_d = I_{in} - I_{out}$, continuously calculating $q = I_{out}/I_{in}$, and continuously comparing q with set values, continuously comparing $I_{out}$ with a set value Set1, setting $I_{out} = I_{in}$ at an instant when q changes and $I_{out}$ exceeds a value Set1, which is an indication of the occurrence of a fault external to the protection zone due to saturation of the CT of the faulted outgoing transmission line, and using the value $I_{out}$ as a compensated current $I_{comp}$ in the protection system in order to prevent tripping of the protection system due to external faults.

2. Method according to claim 1, comprising continuously integrating said value $I_{comp}$ according to $$I_{OUTc} = \int_{tl}^{(tl+T)} I_{comp}\,dt,$$

continuously putting $I_{Rnew} = I_{OUTc}$, continuously calculating $I_{Dnew} = I_{OUT} - I_{OUTc}$, and continuously comparing $I_{Dnew}$ and $I_{Rnew}$ according to $I_{Dnew} - k \times I_{Rnew} > 0$.

3. The method according to claim 2, wherein the factor k is set in the range 0.3–0.8.

4. The method according to claim 1, wherein the incoming current and outgoing current are sampled and wherein the method comprises the steps:

(1) evaluating q according to $q(i-2) > 0.6$ $q(i-1) > 0.6$ $q(i) < 0.8$ (2) evaluating $I_{out}$ according to $I_{out}(i-1) > $ Set1, (3) evaluating $I_{in}$ according to $I_{in}(i) > I_{in}(i-1)$, and (4) evaluating $I_{out}$ according to $$I_{out}(i-1) > I_{out}(i-2)$$

wherein $I_{comp}$ is a compensated current
and $$I_{out}(i-1) \times 0.4 > I_d(i-1),$$

wherein (i) is the present sampling occurrence, and setting $I_{out}=I_{in}$ if all criteria (1)–(4) are fulfilled.

5. The method according to claim 4, further comprising the steps of:
   (5) evaluating $I_{in}$ according to $$I_{in}(i) < \text{Set1}$$

or $I_{in}$ decreases, and resetting $I_{out}$ to its actual value when (5) is fulfilled.

6. The method according to claim 1, comprising maintaining $I_{out}=I_{in}$ for a selected time after $I_{out}$ has been set to $I_{in}$.

7. The method according to claim 6, wherein the selected time is 12 ms.

8. A device for current compensation of a protection system for protecting a zone in a power system, having a number of incoming transmission lines connected to power sources and a number of outgoing transmission lines connected to a number of loads where the power sources and the loads are arranged outside the zone and a number of current transformers coupled to the transmission lines, comprising means for continuously measuring all incoming currents ($I_{in}$) to the zone, means continuously measuring all outgoing currents ($I_{out}$) from the zone, means for continuously calculating a differential current ($I_d$) according to $I_d = I_{in} - I_{out}$, means for continuously calculating $q=I_{out}/I_{in}$, and means for continuously comparing q with a set value S, and means for continuously comparing $I_{out}$ with a set value set1, means for setting $I_{out}=I_{in}$ at the instant when q changes and $I_{out}$ exceeds the value set1, which is an indication of the occurrence of a fault external to the protection zone due to saturation of the CT of the faulted outgoing transmission line, and means for using the set value of $I_{out}$ as a compensated current $I_{comp}$ in the protection system in order to prevent tripping of the protection system.

9. A device according to claim 8, further including means for continuously integrating said value $I_{comp}$ according to $$I_{OUTc} = \int_{tl}^{(tl+T)} I_{comp} \, dt,$$

means for continuously putting $I_{Rnew}=I_{OUTc}$,
means for continuously calculating $I_{Dnew}=I_{OUT}-I_{OUTc}$, and
means for continuously comparing $I_{Dnew}$ and $I_{Rnew}$ according to $I_{Dnew}-k \times I_{Rnew} > 0$.

10. A computer program product comprising computer code means or software code portions for making a computer or processor perform the steps of:
   continuously measuring all the incoming currents ($I_{in}$) to the zone,
   continuously measuring all the outgoing currents ($I_{out}$) from the zone,
   continuously calculating the differential current ($I_d$) according to $I_d = I_{in} - I_{out}$, continuously calculating $q=I_{out}/I_{in}$,
   continuously comparing q with set values,
   continuously comparing $I_{out}$ with a set value Set1,
   setting $I_{out}=I_{in}$ at the instant when q changes and $I_{out}$ exceeds the value S, which is an indication of the occurrence of a fault external to the protection zone due to saturation of the CT of the faulted outgoing transmission line, and
   using the set value of $I_{out}$ as a compensated current $I_{comp}$ in the protection system in order to prevent tripping of the protection system.

11. A computer program product according to claim 10, further comprising continuously integrating said value $I_{comp}$ according to $$I_{OUTc} = \int_{tl}^{(tl+T)} I_{comp} \, dt,$$

continuously putting $I_{Rnew}=I_{OUTc}$,
continuously calculating $I_{Dnew}=I_{OUT}-I_{OUTc}$, and
continuously comparing $I_{Dnew}$ and $I_{Rnew}$ according to $I_{Dnew}-k \times I_{Rnew} > 0$.

12. A computer program product according to claim 10, further comprising sampling the incoming current and outgoing current and performing the steps of:
   (1) evaluating q according to $$q(i-2) > 0.6$$
   $$q(i-1) > 0.6$$
   $$q(i) < 0.8$$

(2) evaluating $I_{out}$ according to $$I_{out}(i-1) > \text{Set1},$$

(3) evaluating $I_{in}$ according to $$I_{in}(i) > I_{in}(i-1), \text{ and}$$

(4) evaluating $I_{out}$ according to $$I_{out}(i-1) > I_{out}(i-2)$$

and $$I_{out}(i-1) \times 0.4 > I_d(i-1),$$

wherein (i) is the present sampling occurrence, and setting $I_{out}=I_{in}$ if all criteria (1)–(4) are fulfilled.

13. A computer program product according to claim 12, further comprising performing the steps of:
   (5) evaluating $I_{in}$ according to $$I_{in}(i) < \text{Set1}$$

or $I_{in}$ decreases, and triggering a timer at the moment when $I_{out}$ is set to $I_{in}$, and resetting $I_{out}$ to its actual value when (5) is fulfilled and the timer has ended.

14. Use of a computer program product according to claim 10, to provide protection measures for a protection zone of a power system.

15. A computer readable medium comprising computer code means according to claim 10.

16. Use of a device according to claim 8 to provide protection measures for a protection zone of a power system.

* * * * *